Figures 6, 7:
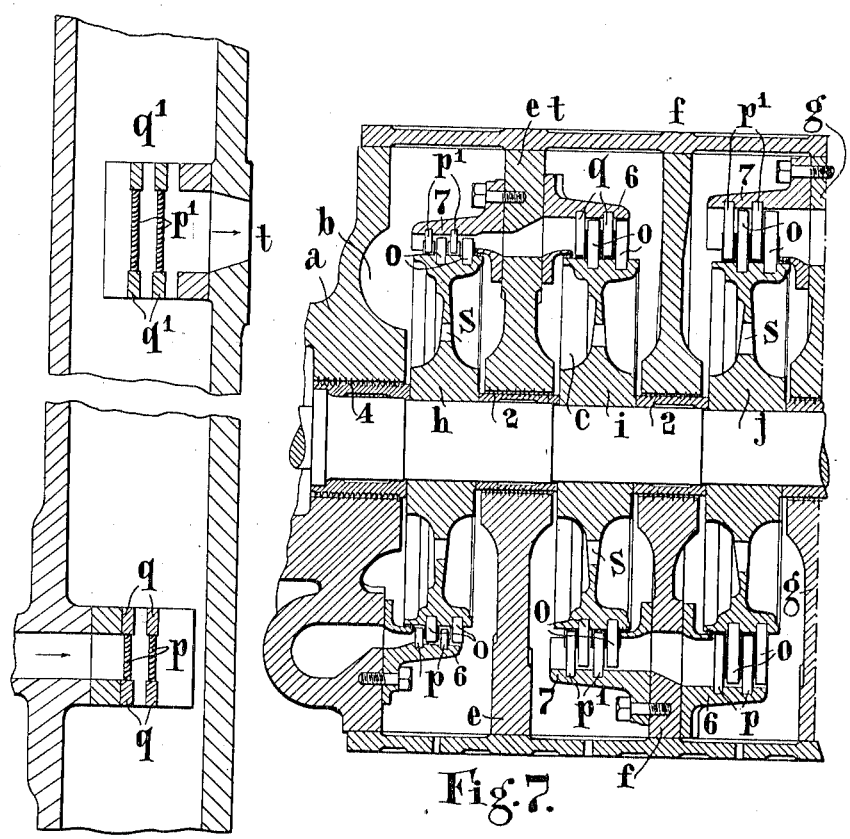

C. A. PARSONS.
TURBINE.
APPLICATION FILED DEC. 28, 1909.
986,942.
Patented Mar. 14, 1911.
6 SHEETS—SHEET 1.
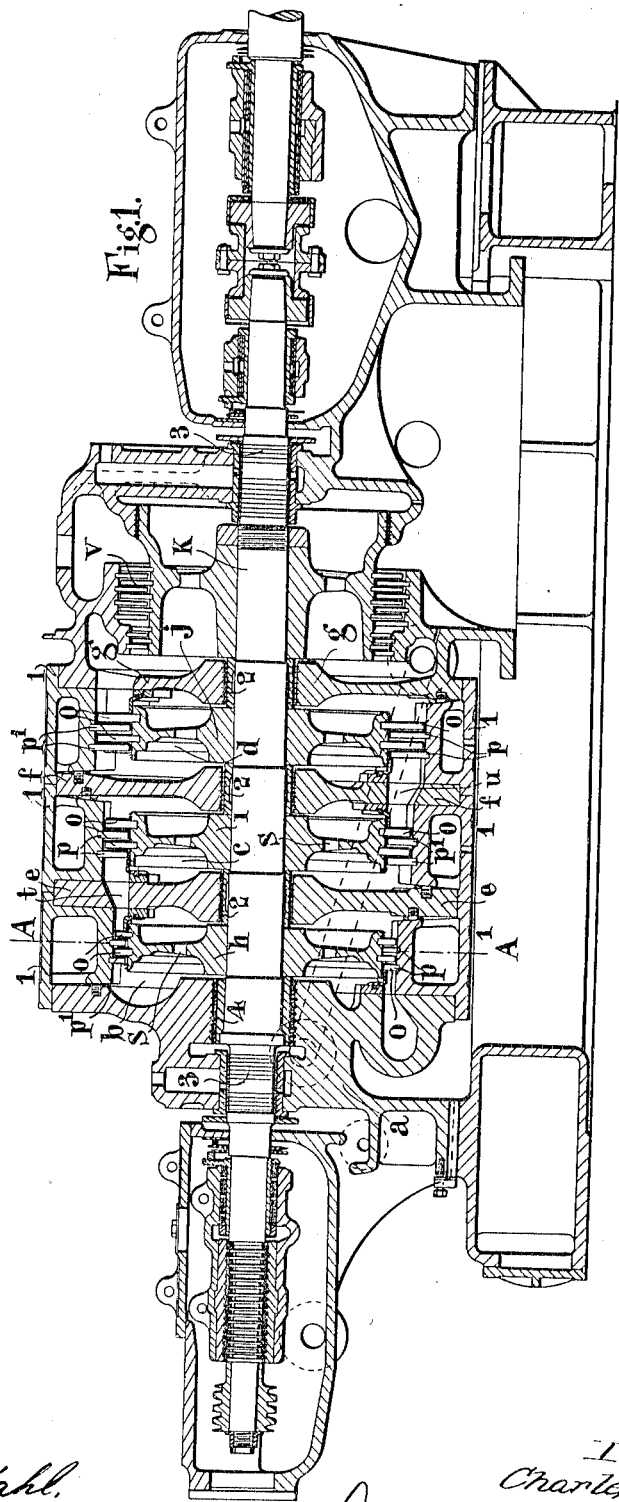
Attest.
Berit M. O'Hahl.
Edward N. Santon
Inventor
Charles A. Parsons
by Spear, Middleton, Donaldson & Spear
Attys.

C. A. PARSONS.
TURBINE.
APPLICATION FILED DEC. 28, 1909.
986,942.
Patented Mar. 14, 1911.
6 SHEETS—SHEET 2.
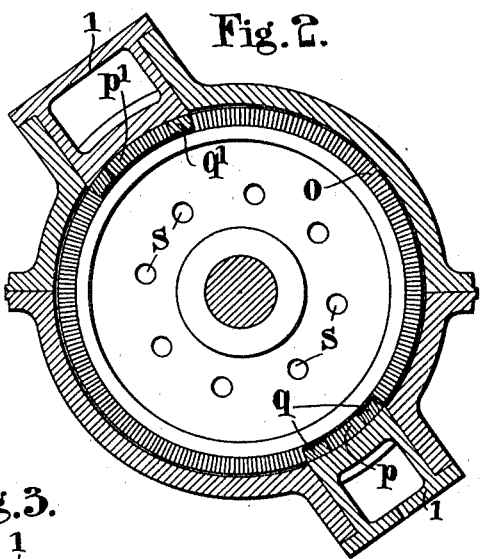
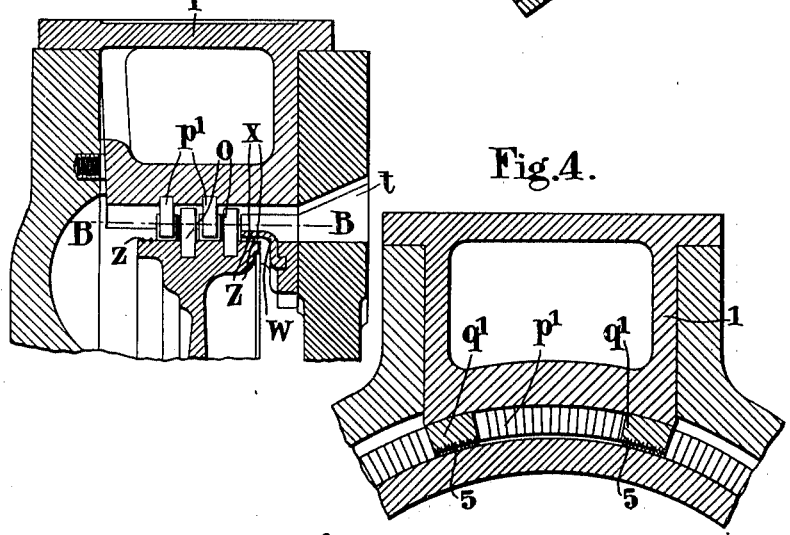

C. A. PARSONS.
TURBINE.
APPLICATION FILED DEC. 28, 1909.

986,942.

Patented Mar. 14, 1911.

6 SHEETS—SHEET 3.

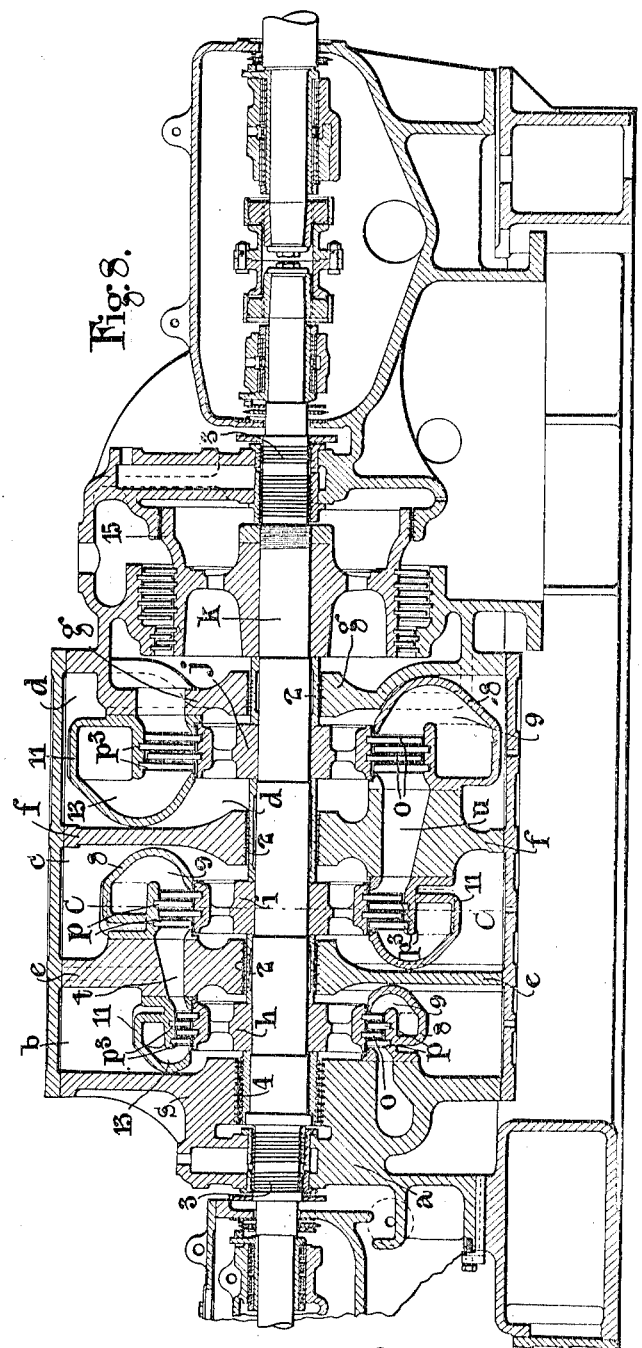

C. A. PARSONS.
TURBINE.
APPLICATION FILED DEC. 28, 1909.
986,942.
Patented Mar. 14, 1911.
6 SHEETS—SHEET 5.
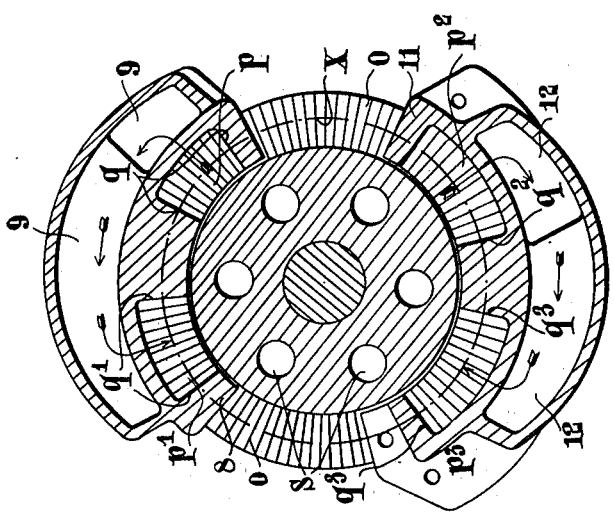
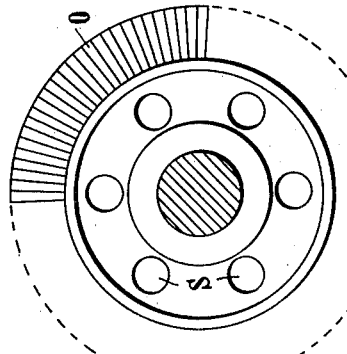
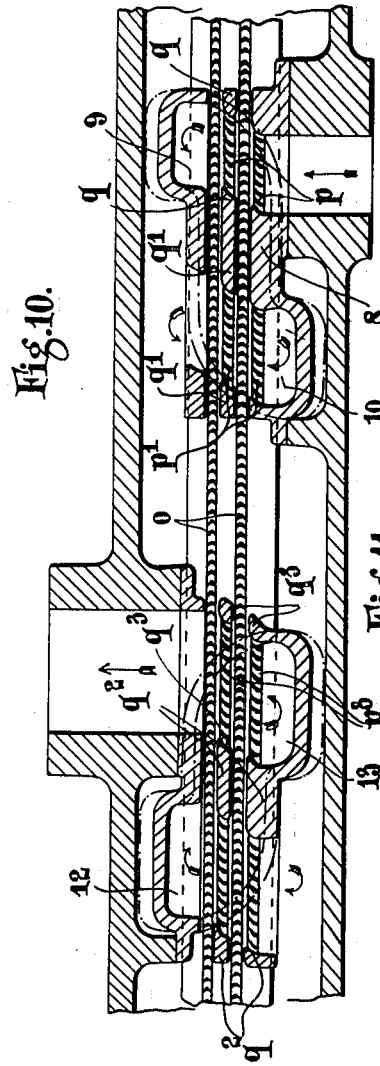
Attest.
Bent. M. Stahl
Edward N. Sarton
Inventor.
Charles A. Parsons
by Spear, Middleton, Donaldson & Spear
Attys

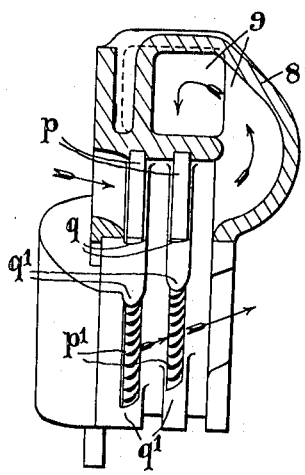
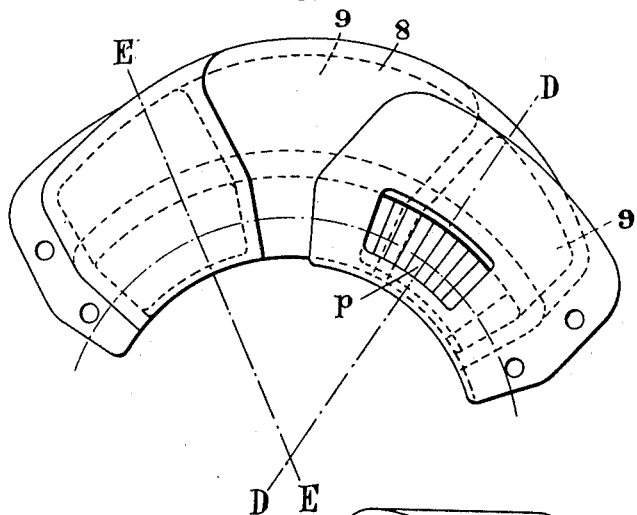
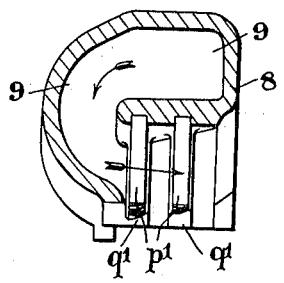
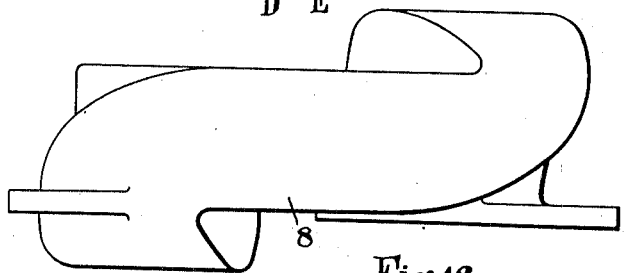
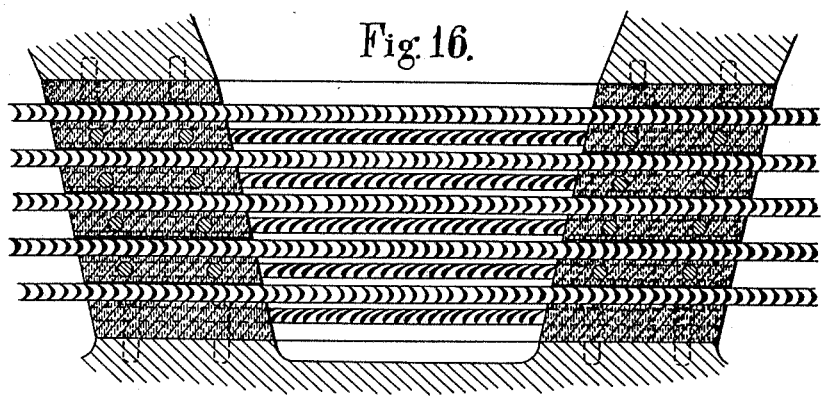

UNITED STATES PATENT OFFICE.

CHARLES ALGERNON PARSONS, OF NEWCASTLE-UPON-TYNE, ENGLAND.

TURBINE.

986,942.

Specification of Letters Patent. Patented Mar. 14, 1911.

Application filed December 28, 1909. Serial No. 535,290.

*To all whom it may concern:*

Be it known that I, CHARLES ALGERNON PARSONS, a subject of the King of Great Britain and Ireland, and residing at Heaton Works, Newcastle-upon-Tyne, in the county of Northumberland, England, have invented certain new and useful Improvements Relating to Turbines, of which the following is a specification.

This invention relates to improvements in partial admission fluid pressure turbines of the type in which the velocity of the working fluid is maintained chiefly or entirely by dropping pressure small amounts at a time in guide blades only a sector of such guides being arranged in front of each ring of rotating blades as distinguished from (*a*) the type in which the velocity of the working fluid is maintained in its course through the turbine by dropping pressure in both the guide and moving blades and (*b*) turbines in which a great drop of pressure takes place in a nozzle to impart great velocity to the working fluid before it acts on the rotating blades which abstract the velocity fractionally practically no further drop of pressure occurring until the fluid has passed through said blades.

The object of the present invention is to provide an improved turbine of the first mentioned type in which the steam is passed a plurality of times through the same working blades in the same direction whereby the length of the turbine is reduced, a further object being to avoid the skin friction and spilling losses which usually occur in such turbines.

I am aware that it has been proposed to pass working fluid a plurality of times through the same row of blades in the turbine, the whole expansion of the fluid from boiler to atmospheric or condenser pressure being effected in a single chamber the whole of the available velocity being abstracted in a single row of rotating blades. No such proposal however has attained practical success mainly on account of excessive leakage losses and of the large heat losses occasioned by the condensation and reëvaporation which are unavoidable when the same working blades are alternately acted on by cooled wet steam in the low pressure and hot steam in the high pressure part. In the present invention however, the drop of pressure per chamber is so small that the losses by spilling and by condensation and reevaporation are reduced to a very small amount. The drop in pressure must not in any circumstances exceed that occasioned by an expansion of about four volumes and it is preferably not more than that occasioned by an expansion of two volumes.

The invention consists in a partial admission turbine of the type first mentioned in this specification in which the segmental guides are arranged to pass the working fluid two or more times in the same direction through the rotating blades in one or more of the separate chambers only a small drop of pressure being permitted in each chamber.

The invention further consists in a modification of the partial admission turbine according to my application No. 467,266, filed December 12, 1908, the feature of the modification being that the working blades are made of crescent formation instead of the formation characteristic of Parsons' blading, thus making the turbine of the type first mentioned in this specification; in other respects the turbine is the same as is set out in my former application above numbered.

Referring now to the accompanying diagrams:—Figure 1 is a sectional elevation of a turbine constructed according to one form of the invention, the steamways being represented in a vertical central plane although they are preferably made on a sloping plane as shown in Fig. 2 which is a cross sectional view on the line A—A of Fig. 1, the supporting parts of the casing being omitted. Figs. 3 and 4 are views of the segment-carrying cover and the upper part of the first wheel and chamber shown respectively in Figs. 1 and 2. Fig. 5 is a developed sectional diagram on the line B—B of Fig. 3 but with only a few of the two rows of working blades shown. Fig. 6 is a developed view to an enlarged scale of the casing shown in Fig. 1 in order to represent the arrangement of the segmental guides. This view is of course diagrammatic only, the proportions not being strictly in accordance with the previously mentioned figures. Fig. 7 is a vertical section of a portion of a modified construction of turbine of the general character shown in Fig. 1. Fig. 8 is a vertical sectional view of a further modification of the invention in which the working fluid is passed by curved passageways twice before it is delivered freely into the chamber and is again passed twice through the same working blades from the chamber before passing into the next chamber. Fig. 9 is a detached view of the middle partial admission wheel shown in Fig. 8. Fig. 10 is a vertical section on the line C—C of Fig. 8 showing the wheel and directing passages. Fig. 11 is a developed view of the guide devices and blades taken on the dotted circle X of Fig. 10. Fig. 12 is a detached front view of the steam directing casting shown at the top of the middle wheel in Fig. 8. Fig. 13 is a plan of the same. Figs. 14 and 15 are sectional views on the lines D—D and E—E respectively of Fig. 12. Fig. 16 is a diagram showing the relative configurations of the guide and rotating blades in the modification of the turbine according to the specification of my previous application before referred to.

In carrying this invention into effect according to the construction shown in Fig. 1, the turbine a, is divided into a number of short chambers, b, c and d, by partition walls, e, f, g. The number of chambers employed depends upon the total pressure drop which it is desired that the partial admission turbine shall deal with the number being of course large if the total pressure drop is large and small if the total pressure drop is small. Inclosed in these chambers are rotary drums, h, i and j, which are mounted on the turbine spindle, k. Each drum carries a few—say two—rings of blades, o, of the crescent type and the casing carries segments of guide blades, p, of the Parsons type terminating in short end blockings, q. The elastic working fluid (hereinafter referred to as steam), after passing through the passageway formed by the segmental guides and blockings, p, q, is delivered directly into the free space of the chamber b, whence it passes over the rotating blades of the wheel and, if desired, through holes, s, therein back to the front side of the wheel so that the wheel rotates immersed in the steam discharged freely into the chamber, b, from the first steamway. From the front side of the chamber the steam then passes again through the running blades of the same wheel but by way of another passageway formed by similar but larger blade segments, p', with end blockings, q, (see Fig. 6) this steamway forming the delivery from the chamber, b, to the port, t, in the partition wall, e. The port, t, leads to the entrance of a passageway of increased sectional area in the next chamber, c, which is at less pressure than the first chamber, this passageway being formed in the same manner as the first passageway of the chamber, b, viz., by segmental guides, p, with short end blockings. After the steam has passed through the first passageway of chamber, c, it is delivered freely into that chamber whence it passes to the front of the wheel, i, and enters a second but still larger passageway formed by end blocked sectors, p', whereby the steam is delivered to a port, u, in the partition wall, f. The port, u, delivers the steam into the first steamway of the next chamber, d, in which it is dealt with in the same manner as in chambers, b and c. After leaving the second passageway of the chamber, d, the steam may pass into an annular admission turbine, v.

The front or steam inlet side of each chamber is screened off from the steam inlet by labyrinth sector and ring packings or similar devices; the other side of the chamber is screened off in a similar manner from the outlet. This may be arranged as shown in Figs. 1 and 3 where the labyrinth sector packings x are carried by a segmental flange w, the rings, z, being of course carried upon the drum. The rows of moving blades are arranged as closely as possible to the guide sectors in order to avoid unnecessary clearance for steam spilling to occur in the chamber.

It will be understood that the high pressure portion of the turbine may be divided into as many partial admission turbine elements of the character herein described as is desired so long as the pressure drop per element is at most only moderate. The partial admission portions may be arranged in casings entirely separated from one another and the low pressure portion of the turbine may be arranged in a separate casing; or an annular low pressure portion may be included with the high pressure partial admission portion.

The parts where the spindle of the turbine passes through the various chambers are suitably packed preferably by labyrinth packings 2, the usual labyrinth packings 3, 3, being provided at the ends of the turbine.

When a low pressure annular admission reaction turbine is combined in the same casing with a partial admission turbine a dummy piston 15, is provided as shown to balance the end thrust of the low pressure turbine.

The stops or end-blockings at each side of the guide sectors are wider than the guide blades and they lie very close to the moving blades in the longitudinal direction. These stops or end-blockings are preferably fitted with thin strips of brass 5, 5 as shown in Fig. 4 on the inside diameter next to the revolving wheels and they only extend a short distance circumferentially over the remainder of the circumference the disks or wheels and their blades rotate with large clearance whereby excessive skin friction is avoided. Any of the wheels may be provided with more than one steam admission passage and separate or coupled controlling valves may be provided in one or more of the passages in order that a large range of power variation may be easily obtained.

The fixed guide sectors and end blockings are preferably carried upon the movable covers 1, the sides of which may be slightly tapered as shown in Fig. 3 in order to facilitate the construction and enable the blades and guides of the turbine to be examined at any time without raising the casing of the turbine. In a modification of the invention however, the end-blocked guide sectors $p$ and $p'$ are carried by castings 6, 7 secured to the walls as shown for example in Fig. 7. Instead of passing the steam only once through the rotating blades of any wheel before discharging it openly into the chamber and then only once more through the rotating blades before passing it to the first passageway of the next chamber, I may pass the steam more than once through the rotating blades before delivering it freely into the chamber and more than once more passing it to the first passageway of the next chamber. The steam may thus be passed four or more times through the same rows of working blades of each wheel; but it is important in all forms of the invention that the total amount of expansion which occurs in any chamber, that is the expansion which occurs between the first sector of guides of the first steamway and the end of the passageway which leads the steam to the first passageway of the next chamber shall not exceed about four volumes—indeed it is preferable that the expansion shall only be about half this amount or even less so that the drop in pressure which occurs per wheel element or chamber shall not be enough to produce serious spilling losses at the sides of the rows of rotating blades or to occasion substantial loss by condensation and re-evaporation consequent upon the rotating blades passing alternately across a steam way and into the large space of the chamber. The number of rows of rotating blades therefore in any chamber when steam is passed several times through the same rotating blades should be kept small, even a single row of rotating blades may be used if desired though I generally prefer to employ two or three rows, although more may be employed if desired.

An arrangement with two rows of rotating blades per wheel with steam passing four times through the same working blades is represented in Figs. 8 to 15 which illustrate the high pressure turbine divided into three wheel elements in three closed chambers $b$ $c$ and $d$. A casting, 8, carries opposite to the steam inlet to the chamber the first sector of guides $p$ in front of the first row of rotating blades $o$ a similar sector of guides being carried in front of the second row of rotary blades, these guide sectors forming the first steamway. After the steam has been passed by these guides once through the two rows of rotating blades it is directed by a curved passage 9, radially outward over the ends of the running blades and thence inward to a space 10 at the front of the wheel. From the space 10, steam passes in the same direction as before through sectors or guides $p'$, $p'$ and the alternating rows of rotating blades $o$, $o$ after which it is delivered freely into the chamber. To the partition wall opposite that which carries the casting 8 there is secured another somewhat similar casting 11 which carries two sectors of guides $p^2$ $p^2$ alternating with the same rotating blades $o$ $o$ and forming a steamway through which the working fluid from the chamber passes in the same direction as before, being then delivered into the passage 12, which conducts it radially outward over the ends of the blades and inward to a space 13 at the front of the wheel. The space 13 opens to a steamway through the guide sectors $p^3$ $p^3$ which alternate with the same row of rotating blades $o$ $o$ and form a steamway opening opposite to a port $t$ which opens to a casting in the next chamber corresponding to the casting, 8. The end blockings $q$, $q'$ $q^2$ and $q^3$ may be formed upon or in one with the castings, 8 and 11 or they may be made separately and secured to these castings in any convenient manner. The pressure in the chamber is approximately a mean between the pressure of the fluid passing through the first sector of guides $p$ and the last sector of guides $p^3$. The high pressure part of the turbine may be divided into as many of these chambers as is desired, but it is preferable to complete the expansion of the steam in an annular admission turbine, such for example as that shown in Fig. 8, which turbine may be provided with a balancing piston 15, of large enough diameter to balance its own steam thrust only, or some of that occasioned by the steam in the partial admission elements also.

In a modification of the invention the sectors forming the passageways may be arranged in cast carrying means in such a manner that the steam shall be passed more than twice through the rotating blades before it is delivered freely into the chamber. Instead of delivering the steam freely into the chamber after it has passed more than once through the rotating blades as shown in Figs. 8 to 14, the steam may be passed directly into the first steamway of the next chamber, the casting 8, being then formed with its discharge passage opening opposite a port in the partition wall which separates the chambers. The steam which spills into the chamber from the first steamway will be drawn into a lower pressure part of the last steamway of the same chamber.

In a modified form of the invention the steam, after being discharged freely into the chamber, instead of being passed twice more through the rotating blades may be passed only once more through the rotating blades by a single passageway which opens opposite a port in the partition wall separating this chamber from the next. The steam pressure in any chamber being approximately a mean between the inlet pressure at the first sector and the outlet pressure at the last sector some leakage will occur into the chamber at parts of a passageway which are at higher pressure than that in the chamber proper and a suction action will be produced on the chamber proper by the steam at lower pressure in parts of the passageway taking steam from the chamber. When it is used for marine propelling plant it may be arranged to deal with the high pressure stages of the steam, the other stages being preferably dealt with by annular admission turbines.

In a further form of the invention the turbine described and illustrated in the specification and drawings of my patent application hereinbefore referred to is modified by the substitution of crescent blades for the Parsons type blades on the rotating drum, the turbine being in other respects as described in my previous application above numbered. The arrangement of the blading in any chamber is illustrated by the diagram Fig. 16 which represents five rows of crescent blades alternating with five sectors of guide blades of the Parsons type with short end blockings. In such a structure as mentioned with reference to Fig. 16, however, no steam end thrust occurs as there is no expansion of steam in the working blades.

Turbines of the character described in this specification may be conveniently used in marine propelling machinery; when so used it is arranged to deal with the high pressure stages of the steam, the lower pressure stages being dealt with in turbines of any suitable type—preferably however in turbines of the annular admission Parsons type. The turbines described are particularly suitable for use in cruising turbines.

Having now described my invention what I claim as new and desire to secure by Letters Patent is:—

1. A turbine having a number of successive stages each of which comprises a plurality of means for fractionally converting the pressure energy of the working fluid into kinetic energy, means alternating with said converting means for transforming said kinetic energy into mechanical energy without any further reduction in the pressure of the fluid; said converting means only partly extending over said transforming means and terminating in short end blockings to form impingement zones, and means whereby the working fluid is passed more than once in the same direction through the same transforming means.

2. A turbine having a number of successive stages each of which comprises a plurality of means for fractionally converting the pressure energy of the working fluid into kinetic energy, means alternating with said converting means for transforming said kinetic energy into mechanical energy without any further change in the pressure of the fluid, said converting means only partly extending over said transforming means and terminating in short end blockings to form impingement zones which gradually increase in cross sectional area in the direction of flow of the fluid through the turbine, and means whereby the working fluid is passed more than once in the same direction through the same transforming means.

3. A turbine having a number of successive stages each of which comprises a plurality of means for fractionally converting the pressure energy of the working fluid into kinetic energy, a rotor, means carried by said rotor and alternating with said converting means for transforming said kinetic energy into mechanical energy without further reduction in the pressure of the fluid, said converting means extending only over a part of said transforming means and terminating in short end blockings to form two or more impingement zones, and means whereby the working fluid is passed more than once through the same transforming means before passing to the next stage of the turbine.

4. A turbine having a number of successive stages each of which comprises a plurality of means for fractionally converting the pressure energy of the working fluid into kinetic energy, a rotor, means carried by said rotor and alternating with said converting means for transforming said kinetic energy into mechanical energy without any further reduction in the pressure of the fluid, said converting means extending only over a part of said transforming means and terminating in short end blockings to form two or more impingement zones which increase gradually in cross sectional area toward the exhaust end of the turbine, and means whereby the working fluid is passed more than once through the same transforming means before passing to the next stage of the turbine.

5. A turbine having a number of successive stages each of which comprises a plurality of means for fractionally converting the pressure energy of the working fluid into kinetic energy, means alternating with said converting means for transforming said kinetic energy into mechanical energy without any further reduction in the pressure of the fluid, and means whereby the working fluid after having passed once through the converting means and transforming means is delivered freely into the stage chamber and is delivered from thence and again passed through the same transforming means before being delivered to the next turbine stage.

6. A turbine having a number of successive stages each of which comprises a plurality of means for fractionally converting the pressure energy of the working fluid into kinetic energy, means interposed between said converting means for transforming said kinetic energy into mechanical energy without any further reduction in the pressure of the fluid, said converting means only partly extending over said transforming means and terminating in short end blockings to form impingement zones, means whereby the working fluid after having passed once through the converting means and transforming means is delivered freely into the stage chamber and is delivered from thence and again passed through the same transforming means before being delivered to the next turbine stage.

7. A turbine having a number of successive stages each of which comprises a plurality of means for fractionally converting the pressure energy of the working fluid into kinetic energy, means alternating with said converting means for transforming said kinetic energy into mechanical energy without any further reduction in the pressure of the fluid, said converting means only partly extending over said transforming means and terminating in short end blockings to form impingement zones which gradually increase in cross sectional area in the direction of flow of the fluid through the turbine, means whereby the working fluid after having passed once through the converting means and transforming means is delivered freely into the stage chamber and is delivered from thence and again passed through the same transforming means before being delivered to the next turbine stage.

8. A turbine having a number of successive stages each of which comprises a plurality of means for fractionally converting the pressure energy of the working fluid into kinetic energy, a rotor, means carried by said rotor and alternating with said converting means for transforming said kinetic energy into mechanical energy without any further reduction in the pressure of the fluid, said converting means extending only over a part of said transforming means, and means whereby the working fluid after having passed once through the converting means and transforming means is delivered into the chamber in which the rotor rotates and is then delivered from thence to the inlet side of and passed again through the same transforming means before being delivered to the next turbine stage.

9. A turbine having a number of successive stages each of which comprises a plurality of means for fractionally converting the pressure energy of the working fluid into kinetic energy, a rotor, means carried by said rotor, and alternating with said converting means for transforming said kinetic energy into mechanical energy without any further reduction in the pressure of the fluid, said converting means extending only over a part of said transformer means and terminating in short end blockings to form two or more impingement zones which increase gradually in cross sectional area toward the exhaust end of the turbine, and means whereby the working fluid after having passed once through the converting means and transforming means is delivered into the chamber in which the rotor rotates and is then delivered from thence to the inlet side of and passed again through the same transforming means before being delivered to the next turbine stage.

10. A turbine having a number of stages each of which comprises a plurality of means for fractionally converting the pressure energy of the working fluid into kinetic energy, means alternating with said converting means for transforming said kinetic energy means for transforming said kinetic energy into mechanical energy without any further reduction in the pressure of the fluid, said converting means extending only over a part of said transforming means and terminating in short end blockings to form two or more impingement zones, and means comprising passages leading from the outlet side of said transforming means to the inlet side of said converting means whereby the working fluid is passed more than once through the same transforming means before being delivered to the next stage of the turbine.

11. A turbine having a number of stages each of which comprises a plurality of means for fractionally converting the pressure energy of the working fluid into kinetic energy, means alternating with said converting means for transforming said kinetic energy into mechanical energy without any further reduction in the pressure of the fluid and means comprising passages leading from the outlet side of said transforming means to the inlet side of said converting means whereby the working fluid after having been passed once through the converting means and transforming means is passed again by way of said passages through the same transforming means and in the same direction and then delivered into the chamber containing said transforming means and then passed again through the same transforming means before being delivered to the next stage of the turbine.

12. A turbine having a number of stages each of which comprises a plurality of means for fractionally converting the pressure energy of the working fluid into kinetic energy, means alternating with said converting means for transforming said kinetic energy into mechanical energy without any further reduction in the pressure of the fluid, said converting means extending only over a part of said transforming means and terminating in short end blockings to form two or more impingement zones, whereby the working fluid after having been passed once through the converting means and transforming means is passed again by way of said passages through the same transforming means and in the same direction and then delivered into the chamber containing said transforming means, and then passed again through the same transforming means before being delivered to the next stage of the turbine.

13. A turbine having in combination a casing, partitions dividing said casing into a number of compartments, a rotor in each compartment, means in each compartment for fractionally converting the pressure energy of the fluid into kinetic energy, means carried by said rotor and alternating with said converting means for transforming said kinetic energy into mechanical energy without further reduction in the pressure of the fluid, said converting means only extending over a part of said transforming means and terminating in short end blockings to form two or more impingement zones, means attached to said partitions, said means having a passage formed therein leading from the last of the transforming means to the first of the converting means forming the next impingement zone, whereby the working fluid after having been passed once through said converting means and transforming means is guided up and over the same by said passages to the inlet side of said means and again passed in the same direction as before through the same transforming means, this being repeated as often as desired before the fluid is delivered to the next compartment.

14. A turbine having in combination a casing, partitions dividing said casing into a number of compartments, a rotor in each compartment, means in each compartment for fractionally converting the pressure energy of the fluid into kinetic energy, means carried by said rotor and alternating with said converting means for transforming said kinetic energy into mechanical energy without any further reduction in the pressure of the fluid, said converting means only extending over a part of said transforming means and terminating in short end blockings to form two or more impingement zones, means attached to said partitions, said means having a passage formed therein leading from the last of the transforming means to the first of the converting means forming the next impingement zone whereby the working fluid after having been passed once through said converting means and transforming means is guided up and over the same by said passages to the inlet side of said means and again passed in the same direction through the same transforming means and then exhausted freely into the chamber containing the same rotor, the fluid thereafter being passed through more of said passages which deliver it to be passed again in the same direction through the same transforming means before being passed to the next turbine compartment.

15. A turbine having in combination a casing, partitions dividing said casing into a number of compartments, a rotor in each compartment, means in each compartment for fractionally converting the pressure energy of the fluid into kinetic energy, means carried by said rotor and alternating with said converting means for transforming said kinetic energy into mechanical energy without any further reduction in the pressure of the working fluid, said converting means only extending over a part of said transforming means and terminating in short end blockings to form two or more impingement zones, means attached to said partitions said means having a passage formed therein leading from the last of the transforming means to the first of the converting means, whereby the working fluid is passed more than once through the same transforming means and always in the same direction and exhausted freely into the rotor compartment after having passed through said transforming means before being delivered from the transforming means to the next turbine compartment.

16. A turbine having a number of stages each formed within a common casing, partitions separating each stage into separate chambers, each stage comprising a plurality of means for fractionally converting the pressure energy of the working fluid into kinetic energy, a rotor in each chamber, means carried by said rotor and alternating with said converting means, said means transforming said kinetic energy into mechanical energy without any further reduction in the pressure of the working fluid, said converting means extending only over a part of said transforming means and terminating in short end blockings so as to form sectors having two or more impingement zones, while the sectors are themselves attached to the turbine casing and means whereby the working fluid is passed several times through the same transforming means and in the same direction.

17. A turbine having a plurality of stages each formed within a common casing, partitions separating each stage into separate chambers, each stage comprising a plurality of means for fractionally converting the pressure energy of the working fluid into kinetic energy, a rotor in each chamber, means carried by said rotor and alternating with said converting means, said means transforming said kinetic energy into mechanical energy without any further reduction in the pressure of the working fluid, said converting means extending over only a part of said tranforming means and terminating in short end blockings so as to form sectors having two or more impingement zones, while the sectors themselves are attached to the partitions, and means whereby the working fluid is passed several times through the same transforming means and in the same direction.

18. A turbine having a number of stages each formed within a common casing, partitions separating each stage into separate chambers, each stage comprising a plurality of means for fractionally converting the pressure energy of the working fluid into kinetic energy, a rotor in each chamber means carried by said rotor and alternating with said converting means, said means transforming said kinetic energy into mechanical energy without any reduction in the pressure of the fluid, said converting means extending only over a part of said transforming means and terminating in short end blockings so as to form sectors having two or more impingement zones, removable covers attached to said turbine casing for carrying said sectors of transforming means and means whereby the working fluid is passed several times through the same transforming means and in the same direction.

19. A turbine having in combination a casing, partitions dividing said casing into a number of compartments, a plurality of sectors of fixed guide blades of the Parsons type within each compartment, a rotor element in each of said compartments, a plurality of rows of crescent shaped blading carried by said rotor and alternating with said fixed sectors, and means whereby the working fluid is passed more than once in the same direction through the same rotating blading.

20. A turbine having in combination a casing, partitions dividing said casing into a number of compartments, a plurality of sectors of fixed guide blades of the Parsons type within each compartment, a rotor element in each of said compartments, a plurality of rows of crescent shaped blading carried by said rotor and alternating with said fixed sectors, short end blockings at each side of said sectors of guide blades to form two or more impingement zones and means whereby the working fluid is passed more than once in the same direction through the same rotating blading.

21. A turbine having in combination a casing, partitions dividing said casing into a number of compartments, a plurality of sectors of fixed guide blades of the Parsons type within each compartment, a rotor element in each of said compartments, a plurality of rows of crescent shaped blading carried by said rotor and alternating with said fixed sectors, short end blockings at each side of said sectors of guide blades to form two or more impingement zones which increase gradually in cross sectional area in the direction of flow of the working fluid and means whereby the working fluid is passed more than once in the same direction through the same rotating blading.

22. A turbine having in combination a casing, partitions dividing said casing into a number of compartments, a plurality of sectors of fixed guide blades of the Parsons type within each compartment, a rotor element in each of said compartments, a plurality of rows of crescent shaped blading carried by said rotor and alternating with said fixed sectors and means whereby the working fluid is passed more than once in the same direction through the same rotating blading, and an annular admission reaction turbine in which the working fluid is further expanded.

23. A turbine having in combination a casing, partitions dividing said casing into a number of compartments, a plurality of sectors of guide blades of the Parsons type, detachable covers carried by said casing and holding said guide blade sectors in position, a rotor element in each of said compartments, a plurality of rows of crescent shaped blading carried by said rotors and alternating with said fixed guide blade sectors and means whereby the working fluid is passed more than once in the same direction through the same rotor blades.

24. A turbine having in combination a casing, partitions dividing said casing into a number of compartments, a plurality of sectors of guide blades of the Parsons type, carried by said partitions, a rotor element in each of said compartments, a plurality of rows of crescent shaped blading carried by said rotors and alternating with said fixed guide blade sectors, and means whereby the working fluid is passed more than once in the same direction through the same rotor blades.

25. A turbine having in combination a casing, partitions dividing said casing into compartments, a plurality of sectors of fixed guide blades of the Parsons type within each compartment, a rotor element in each compartment, a plurality of rows of crescent shaped blading carried by said rotor and alternating with said fixed guide blades, and means whereby the working fluid after passing once through said guide and rotor blades is again delivered to the same rotating blades and passes through these again and in the same direction as before, and finally delivered to the next compartment.

26. A turbine having in combination a casing, partitions dividing said casing into compartments, a plurality of sectors of fixed guide blades of the Parsons type within each compartment, a rotor element in each compartment, a plurality of rows of crescent shaped blading carried by said rotor and alternating with said fixed guide blades, and means whereby the working fluid after passing once through said guide and rotor blades is again delivered to the same rotating blades and passes through these again and in the same direction as before and finally delivered to the next compartment, an annular admission reaction turbine within the same casing and receiving the working fluid exhausted from the last of the compartments.

27. A turbine having in combination a casing, partitions dividing said casing into compartments, a plurality of sectors of fixed guide blades of the Parsons type within each compartment, a rotor element in each compartment, a plurality of rows of crescent shaped blading carried by said rotor and alternating with said fixed guide blades, and means whereby the working fluid after passing once through said guide and rotor blades is again delivered to the same rotating blades and passes through these again and in the same direction as before and finally delivered to the next compartment, an annular admission turbine of the Parsons reaction type receiving the fluid exhausted from the last of said compartments.

28. A turbine having in combination a casing, partitions dividing said casing into compartments, a plurality of sectors of fixed guide blades of the Parsons type within each compartment, a rotor element in each compartment, a plurality of rows of crescent shaped blading carried by said rotor and alternating with said fixed guide blades, said sectors terminating in short end blockings to form one or more impingement zones, and means whereby the working fluid after having passed once through the guide and rotating blades is exhausted freely into the compartment containing the rotor from which compartment the fluid is again delivered to and passed through the same rotating blades in the same direction as before, the fluid thereafter passing to the blades in the next compartment.

29. A turbine having in combination a casing, partitions dividing said casing into compartments, a plurality of sectors of fixed guide blades of the Parsons type within each compartment, a rotor element in each compartment, a plurality of rows of crescent shaped blading carried by said rotor and alternating with said fixed guide blades, members each having a passage therein whereby the fluid having passed once through the rotating blades is carried up and over these blades to the inlet side thereof and again passed in the same through the same rotating blades and finally delivered to the next compartment.

30. A turbine having in combination, a casing, partitions dividing said casing into compartments, a plurality of sectors of fixed guide blades of the Parsons type within each compartment, a rotor element in each compartment, a plurality of rows of crescent shaped blading carried by said rotor and alternating with said fixed guide blades, members each having a passage therein whereby the fluid having passed once through the rotating blades is delivered into the rotor compartment and then guided up and over the rotating blades to the inlet thereto and again passed through the same rotating blades in the same direction as before, the fluid thereafter passing to the next compartment.

31. Propelling plant for vessels comprising a turbine in which the expansion of the high pressure working fluid is effected, said turbine comprising a number of successive stages each of which comprises a plurality of means for fractionally converting the pressure energy of the working fluid into kinetic energy, means alternating with said means transforming said kinetic into mechanical energy without any further reduction in the pressure of the fluid, the converting means only partly extending over said transforming means and terminating in short end blockings to form impingement zones which gradually increase in cross sectional area in the direction of flow of the fluid through the turbine and means whereby the working fluid is passed more than once in the same direction through the same transforming means.

32. Propelling plant for vessels comprising a turbine in which the expansion of the high pressure working fluid is effected, said turbine comprising a number of stages each formed within a common casing, partitions separating each stage into separate chambers, each stage comprising a plurality of means for fractionally converting the pressure energy of the working fluid into kinetic energy, a rotor in each chamber, means carried by said rotor and alternating with said converting means, said means transforming said kinetic energy into mechanical energy without any further reduction in the pressure of the fluid, the converting means extending only over a part of said transforming means and terminating in short end blockings so as to form sectors having two or more impingement zones while the sectors are themselves attached to the turbine casing and means whereby the working fluid is passed several times through the same transforming means and in the same direction.

33. In an elastic-fluid turbine, the combination of a rotor having rows of buckets against which the motive fluid acts without substantial conversion of pressure into velocity, rows of intermediate buckets between each two rows of rotor buckets through the working passage of which the fluid received from the rotor buckets passes, the same intermediate buckets in addition to directing the fluid acting to convert a certain amount of its pressure into velocity, a device for discharging motive fluid against the first row of rotor buckets with a moderate velocity, a device which presents an annular surface in close proximity to the rotor to reduce leakage from said device, a casing for the parts, and an exhaust conduit.

34. In an elastic-fluid turbine, the combination of a rotor having rows of buckets, a stator also having rows of buckets located between those of the rotor, the rotor buckets acting to extract velocity from the motive fluid without substantial conversion of pressure into velocity while the stator buckets direct the fluid and act to convert pressure into velocity, covers for the buckets, those of the stator being located in close proximity to the rotor and beyond the path of the fluid jet to provide a restricted clearance to reduce leakage while those of the rotor are widely separated from the casing and have an unrestricted clearance, guide blade sectors of the Parsons type for discharging fluid against the first row of buckets, a casing for the turbine, and an exhaust conduit.

35. In an elastic-fluid turbine, the combination of a rotor having rows of buckets, a stator also having rows of buckets located between those of the rotor, the rotor buckets acting to extract velocity from the motive fluid without substantial conversion of pressure into velocity while the stator buckets direct the fluid and act to convert pressure into velocity, the alternate rows of buckets increasing in depth step by step, covers for the buckets, those of the stator having a restricted clearance with the rotor, and those of the rotor an unrestricted clearance with respect to the casing, guide blade sectors of the Parsons type which convert a portion only of the pressure of the fluid into velocity and discharge it against the first row of buckets, a casing, and an exhaust conduit therefor.

36. In an elastic-fluid turbine, the combination of a rotor and a stator both having rows of buckets, those of the rotor extracting velocity of the motive fluid without substantial pressure conversion while those of the stator act to convert a portion of the pressure into velocity and direct the fluid against the rotor buckets, the depth of the buckets increasing by rows step by step, a device for discharging fluid with a moderate velocity against the first row of buckets, means for reducing leakage from the said device, other means for reducing leakage around the ends of the stator buckets, a casing, and an exhaust conduit.

In testimony whereof, I affix my signature in presence of two witnesses.

CHARLES ALGERNON PARSONS.

Witnesses:
  FREDERICK GORDON HAY BEDFORD,
  ALBERT WILLIAM PARR.